(12) United States Patent
Liu et al.

(10) Patent No.: US 11,257,001 B2
(45) Date of Patent: Feb. 22, 2022

(54) PREDICTION MODEL ENHANCEMENT

(71) Applicant: International Business Machines Corporation, Armonk, NY (US)

(72) Inventors: Lu Liu, Singapore (SG); Sia Kai Julian Tan, Singapore (SG); Kevin A. Dore, II, Wappinger Falls, NY (US); Steven Hurley, Jr., Denton, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 503 days.

(21) Appl. No.: 16/155,135

(22) Filed: Oct. 9, 2018

(65) Prior Publication Data

US 2020/0111015 A1  Apr. 9, 2020

(51) Int. Cl.
*G06N 3/04* (2006.01)
*G06N 3/08* (2006.01)
*G06N 7/00* (2006.01)
*G06N 20/00* (2019.01)

(52) U.S. Cl.
CPC .......... *G06N 7/005* (2013.01); *G06N 3/0454* (2013.01); *G06N 3/084* (2013.01); *G06N 20/00* (2019.01)

(58) Field of Classification Search
CPC .............................. G06N 3/0454; G06N 3/084
See application file for complete search history.

(56) References Cited

U.S. PATENT DOCUMENTS

| | | | |
|---|---|---|---|
| 5,761,093 A | 6/1998 | Urbish et al. | |
| 5,822,218 A | 10/1998 | Moosa et al. | |
| 6,832,205 B1 | 12/2004 | Aragones et al. | |
| 7,457,725 B1 | 11/2008 | Civilini | |
| 7,539,907 B1 | 5/2009 | Johnsen et al. | |
| 7,730,364 B2 | 6/2010 | Chang et al. | |
| 2005/0060618 A1 | 3/2005 | Guha | |

(Continued)

FOREIGN PATENT DOCUMENTS

| | | |
|---|---|---|
| CN | 102867221 A | 1/2013 |
| CN | 103778486 A | 5/2014 |

(Continued)

OTHER PUBLICATIONS

Chigurupati et al., "Predicting Hardware Failure Using Machine Learning", 2016, IEEE (Year: 2016).*

(Continued)

*Primary Examiner* — Hal Schnee
(74) *Attorney, Agent, or Firm* — Cantor Colburn LLP; Tihon Poltavets

(57) ABSTRACT

An enhanced prediction model utilizing product life cycle segmentation and historic prediction data for generating more accurate future failure rates. Input data is segmented into groups based on failure modes of a corresponding life cycle. A prediction model such as Weibull analysis is implemented for each segmented group. Historical prediction data is also segmented into groups. Prediction parameters for each group of segmented historical prediction data are compared with one another and the comparisons are then used to adjust the prediction parameters generated from the segmented groups of input data. Updated parameters for the input data are then output thereby generating a new future failure rate.

8 Claims, 9 Drawing Sheets

(56) References Cited

U.S. PATENT DOCUMENTS

| | | | |
|---|---|---|---|
| 2008/0120149 A1* | 5/2008 | Virgil | G06Q 10/08 |
| | | | 700/108 |
| 2012/0053983 A1* | 3/2012 | Vittal | F03D 80/50 |
| | | | 705/7.28 |
| 2015/0003847 A1 | 1/2015 | Yang et al. | |
| 2015/0149248 A1 | 5/2015 | Mizuta et al. | |
| 2016/0210183 A1* | 7/2016 | Hampapur | G06F 11/0751 |
| 2017/0031914 A1* | 2/2017 | de Mars | G06Q 10/02 |
| 2017/0047181 A1* | 2/2017 | Yang | G01R 31/3277 |
| 2018/0005151 A1* | 1/2018 | Liao | G06Q 10/0637 |
| 2018/0060192 A1* | 3/2018 | Eggert | G06F 11/16 |
| 2019/0095781 A1* | 3/2019 | Vedula | G06K 9/00536 |
| 2019/0102700 A1* | 4/2019 | Babu | G06N 5/025 |
| 2019/0155672 A1* | 5/2019 | Wang | G06K 9/6284 |
| 2019/0235484 A1* | 8/2019 | Ristovski | G06N 5/04 |
| 2021/0133018 A1* | 5/2021 | Chakraborty | G06F 11/0721 |
| 2021/0157310 A1* | 5/2021 | Lavid Ben Lulu | |
| | | | G05B 23/0283 |

FOREIGN PATENT DOCUMENTS

| | | |
|---|---|---|
| CN | 107464023 A | 12/2017 |
| JP | H1034122 A | 2/1998 |

OTHER PUBLICATIONS

Zhang, Qing, Cheng Hua, and Guanghua Xu. "A mixture Weibull proportional hazard model for mechanical system failure prediction utilising lifetime and monitoring data." Mechanical Systems and Signal Processing 43.1-2 (2014): 103-112. (Year: 2014).*

Authors et al.: Disclosed Anonymously; "Machine Learning for Hardware Simulation"; IP.com; IP.com No. IPCOM000251992D; Dec. 13, 2017; 33 Pages.

Authors et al.: Disclosed Anonymously; "Reinforcement Learning for Fuzzing Testing Techniques"; IP.com; IP.com No. IPCOM000252021D; Dec. 13, 2017; 36 Pages.

Reynolds et al.; "A Computational Model of Event Segmentation From Perceptual Prediction"; Cognitive Science; vol. 31; 2007; pp. 613-643.

Sheng; "Improving Component Reliability Through Performance and Condition Monitoring Data Analysis"; National Renewable Energy Laboratory; Wind Farm Data Management & Analysis North America; Mar. 25-26, 2015; 41 Pages.

Zacks et al.; "Prediction Error Associated with the Perceptual Segmentation of Naturalistic Events"; Journal of Cognitive Neuroscience; vol. 23, No. 12; 2011; pp. 4057-4066.

International Search Report and Written Opinion for International Application No. PCT/IB2019/058422; Application Filing Date Oct. 3, 2019; dated Jan. 15, 2020 (9 pages).

* cited by examiner

PREDICTION MODEL ENHANCEMENT

BACKGROUND

The present invention generally relates to failure rate prediction models, and more specifically, to enhancing a failure prediction model in order to make more accurate failure rate predictions.

Failure rate predictions are needed to provide warranties for systems and components. There are many types of prediction models for performing life data analysis. The failure rate of a system typically depends on time with the rate varying over the life cycle of the system or component. However, some prediction models are not well suited for some industries. Also, the amount or quality of the input data may affect the accuracy of failure predictions provided by the prediction models. For example, current methods for estimating component failure rates have limitations related to, for example, sample size, cold start and model fluctuations. In particular, the usefulness of failure estimates is diminished early in the life cycle of a single component vintage which skews future predictions. Thus, these limitations diminish the usefulness of failure rate estimates.

Moreover, it is often difficult to isolate root causes of the failures of a product. Corrective actions therefore cannot be taken effectively. Also, monitoring product performance history may provide alerts for what has already happened, but it does not provide alerts for what is going to happen in the future. For example, data for prediction of a five-year return rate will only achieve high accuracy with stable modeling output after about two years' worth of data is collected. Getting a stable and accurate prediction after only two years is likely too late to then request that suppliers take corrective actions because systems or components may be at the end of their life. Every two or three years the next generation system or components appear with better capabilities. Thus, enhancing the accuracy of failure rate predictions of a prediction model allows preventative actions to be taken more quickly to improve product reliability.

SUMMARY

It should be appreciated that this Summary is provided to introduce a selection of concepts in a simplified form that are further described below in the Detailed Description. This Summary is not intended to be used to limit the scope of the claimed subject matter.

Embodiments of the present invention are directed to a computer-implemented method for enhancing a prediction model for generating future failure predictions. A non-limiting example of the computer-implemented method includes segmenting input data into groups. A prediction model is implemented for each group of the segmented input data. The computer-implemented method also includes segmenting historical prediction data into groups and then comparing actual and predicted parameters within each group of the segmented historical prediction data. Based on the comparisons, the parameters defined by the prediction model for each group of the segmented input data are adjusted. The computer-implemented method then includes outputting updated parameters of the prediction model for the input data.

According to another embodiment, a non-limiting example of a computer-implemented method includes inputting data into a prediction model to generate an initial failure mode for a first product. The initial failure mode provides a future failure rate for the first product defined by at least two parameters. The computer-implemented method also includes segmenting historical prediction data including failure modes that have occurred during a life cycle of a second product and then modifying the at least two parameters of the initial failure mode generated by the prediction model for the first product based on the segmented historical prediction data. Then a new failure mode is generated with the prediction model defining a new future failure rate for the first product utilizing the modified at least two parameters.

Embodiments of the present invention are directed to a system for enhancing a prediction model for generating future failure predictions. A non-limiting example of the system includes a processor communicatively coupled to a memory and a set of computer instructions stored in the memory which, when executed by the processor, performs a method that includes segmenting input data into groups based on a life cycle and each group of input data corresponding with a different failure mode of the life cycle. A prediction model is implemented for each group of segmented input data. Historical prediction data is segmented into groups based on failure modes having occurred during the life cycle. Actual parameters and predicted parameters of each group of the segmented historical prediction data are then compared. Based on those comparisons, the parameters defined by the prediction model are adjusted for each group of the segmented input data. The method also includes outputting a future failure rate utilizing the updated parameters of the prediction model. The method may then include storing the updated parameters as historical prediction data.

According to another embodiment, a non-limiting example of a system for enhancing a prediction model for generating future failure predictions includes a processor communicatively coupled to a memory and a set of computer instructions stored in the memory which, when executed by the processor, performs a method that includes inputting data into a prediction model to generate an initial failure mode for a first product. The failure mode provides a future failure rate for the first product defined by at least two parameters. The method then includes segmenting historical prediction data comprising a plurality of failure modes having occurred during a life cycle of a second product and modifying the at least two parameters of the initial failure mode generated by the prediction model for the first product based on the segmented historical prediction data. A new failure mode is generated with the prediction model to define a new future failure rate for the first product utilizing the modified at least two parameters.

Embodiments of the invention are directed to a computer program product for generating future failure predictions, the computer program product including a computer readable storage medium having program instructions embodied therewith. The program instructions are executable by a processor to cause the processor to perform a method. A non-limiting example of the method includes segmenting input data into groups based on a life cycle and each group of segmented input data corresponding with a different failure. The method then includes implementing a prediction model for each group of segmented input data and segmenting historical prediction data into groups based on a plurality of failure modes. Actual parameters and predicted parameters of each group of the segmented historical prediction data are compared with one another to determine differences evidencing prediction errors. Based on those comparisons, the method includes adjusting the parameters defined by the prediction model for each group of the segmented input data. The method also includes outputting updated parameters of the prediction model. The method may also include storing the updated parameters as historical prediction data.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
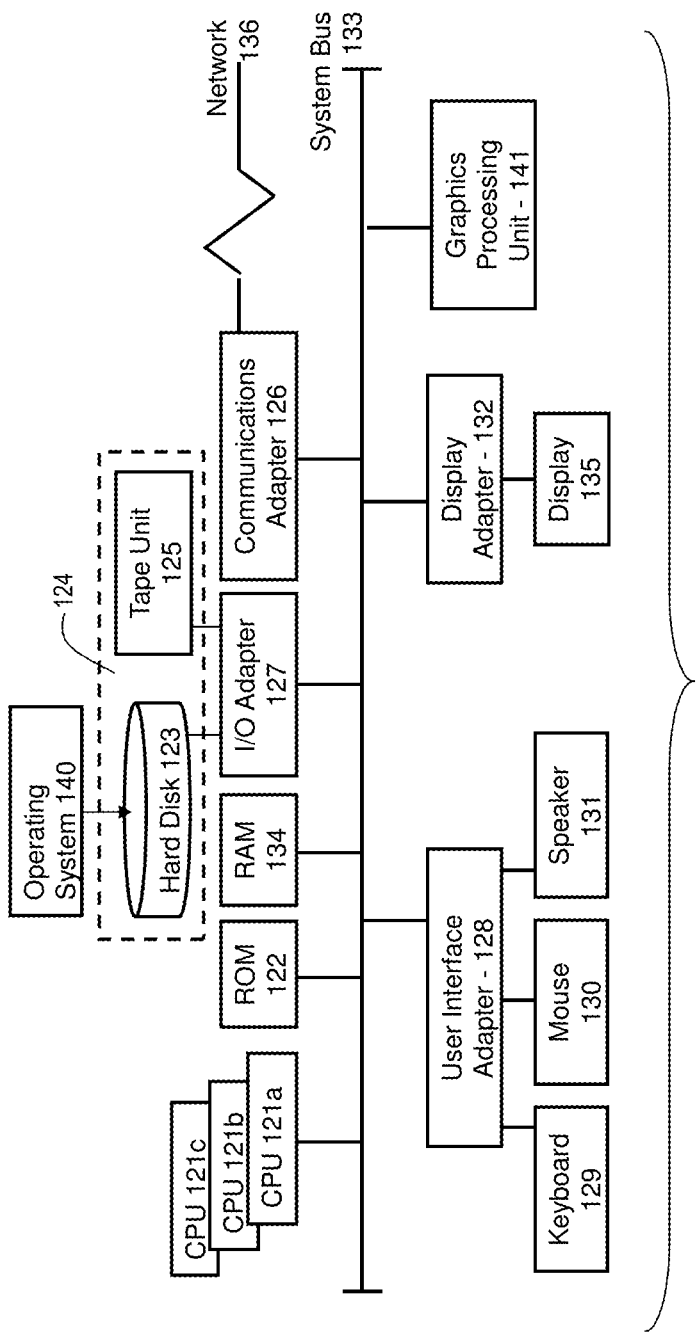
FIG. 1 depicts a block diagram illustrating an exemplary computer processing system that may be utilized to implement exemplary embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of the aspects of the invention, one or more embodiments of the invention address the above-described shortcomings of the prior art by enhancing the prediction model in order to determine more accurate prediction parameters. The prediction model is enhanced by utilizing multivariate segmentation on the new input data and then having the prediction model separately process each segmented group of input data. The prediction model is then further enhanced by also segmenting historical prediction data into groups and determining equalization coefficient factor pairs for each segmented group of the historical prediction data. Previous prediction parameters are compared with the corresponding actual parameters to determine where errors have occurred over time. These equalization coefficient factor pairs are used as feedback to an equalization coefficient model and the prediction parameters determined by the prediction model for the segmented input data are also feedback into the same equalization coefficient model. The equalization coefficient factor pairs are used to adjust or modify the prediction parameters of the segmented input data. Thus, modifying the prediction parameters of the segmented input data enhances the prediction model resulting in improved failure rate accuracy.

The above-described aspects of the invention address the shortcomings of the prior art by allowing the use of the same failure prediction model across multiple segmented groups without requiring updating of the prediction model itself. The prediction parameters are updated or modified in order to regularize the prediction model over the life cycle across multiple segmentations. In other words, regularization is applied at the segment level allowing the prediction model to remain stable across multiple segmentations.

Referring to FIG. 1, there is shown an embodiment of a processing system 100 configured as a personal computer for implementing the teachings herein. In this embodiment, the system 100 has one or more central processing units (processors) 121a, 121b, 121c, etc. (collectively or generically referred to as processor(s) 121). In one or more embodiments, each processor 121 may include a reduced instruction set computer (RISC) microprocessor. Processors 121 are coupled to system memory 134 and various other components via a system bus 133. Read only memory (ROM) 122 is coupled to the system bus 133 and may include a basic input/output system (BIOS), which controls certain basic functions of system 100.

FIG. 1 further depicts an input/output (I/O) adapter 127 and a network adapter 126 coupled to the system bus 133. I/O adapter 127 may be a small computer system interface (SCSI) adapter that communicates with a hard disk 123 and/or tape storage drive 125 or any other similar component. I/O adapter 127, hard disk 123, and tape storage device 125 are collectively referred to herein as mass storage 124. Operating system 140 for execution on the processing system 100 may be stored in mass storage 124. A network adapter 126 interconnects bus 133 with an outside network 136 enabling data processing system 100 to communicate with other such systems. A screen (e.g., a display monitor) 135 is connected to system bus 133 by display adaptor 132, which may include a graphics adapter to improve the performance of graphics intensive applications and a video controller. In one embodiment, adapters 127, 126, and 132 may be connected to one or more I/O busses that are connected to system bus 133 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 133 via user interface adapter 128 and display adapter 132. A keyboard 129, mouse 130, and speaker 131 all interconnected to bus 133 via user interface adapter 128, which may include, for example, a Super I/O chip integrating multiple device adapters into a single integrated circuit.

In exemplary embodiments, the processing system 100 includes a graphics processing unit 141. Graphics processing unit 141 is a specialized electronic circuit designed to manipulate and alter memory to accelerate the creation of images in a frame buffer intended for output to a display. In general, graphics processing unit 141 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 121, storage capability including system memory 134 and mass storage 124, input means such as keyboard 129 and mouse 130, and output capability including speaker 131 and display 135. In one embodiment, a portion of system memory 134 and mass storage 124 collectively store an operating system coordinate the functions of the various components shown in FIG. 1. Also, in one or more embodiment the system may include or be coupled to one or more databases or a database management system.

Figure 2:
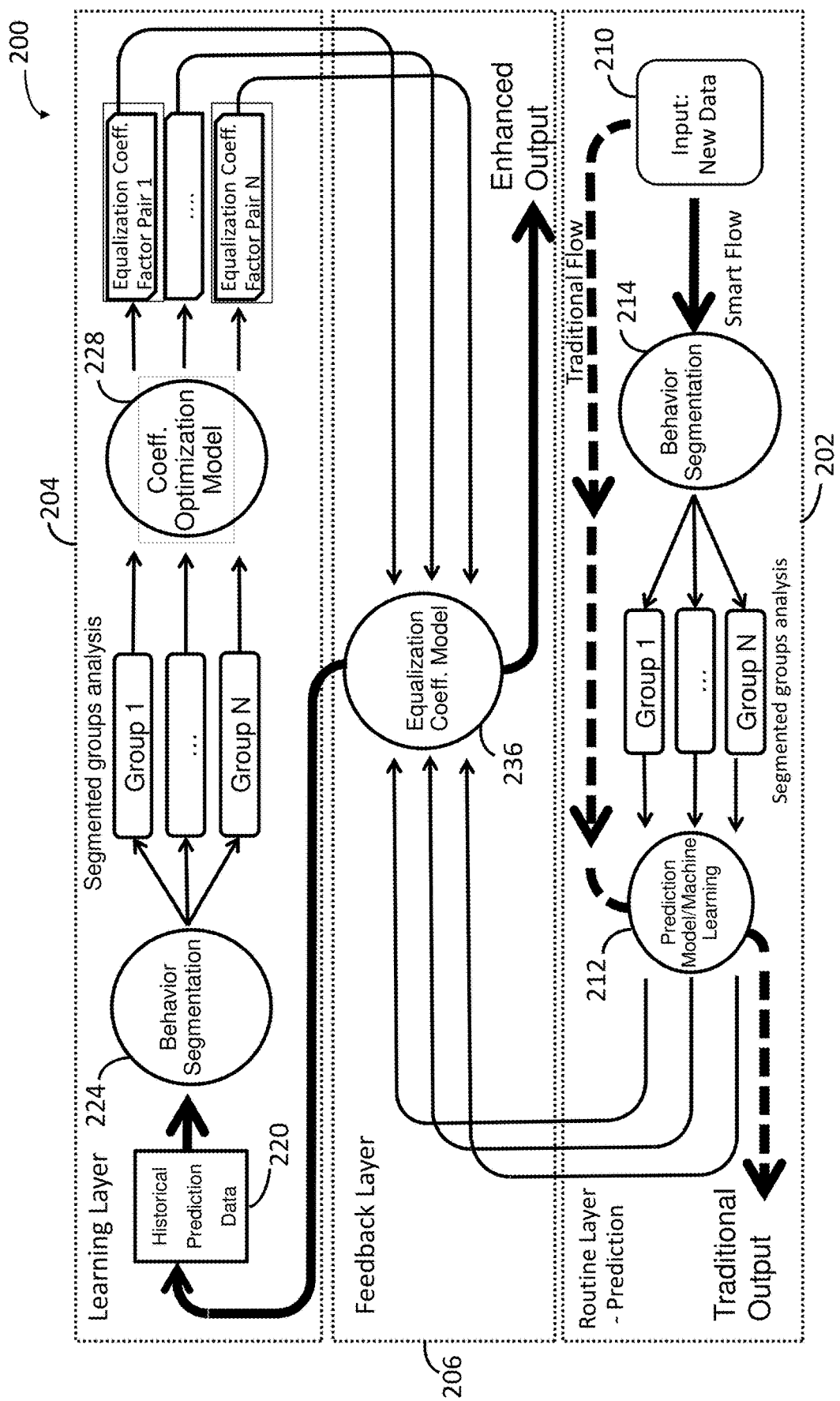
FIG. 2 depicts a flow diagram of an enhanced prediction model having different layers for generating future failure predictions according to one or more embodiments of the present invention.

FIG. 2 depicts a flow diagram 200 of an enhanced prediction model having different layers for generating more accurate future failure predictions. Routine layer 202 may be referred to as a prediction layer. The routine layer 202 includes a broken arrow illustrating the traditional flow for generating failure modes for predicting failure rates. The traditional flow extends from new data input 210 directly to prediction model 212.

In the traditional flow, the new data input skips behavior segmentation 214 and goes directly to the predictive model 212. The prediction model 212 may be any know model that utilizes machine learning, pattern recognition or statistical techniques to give computers the ability to train and learn with data. The traditional output is provided directly from the predictive model 212. The parameters output from the prediction model, for example, to estimate future failure rates are what is estimated.

Figure 3:
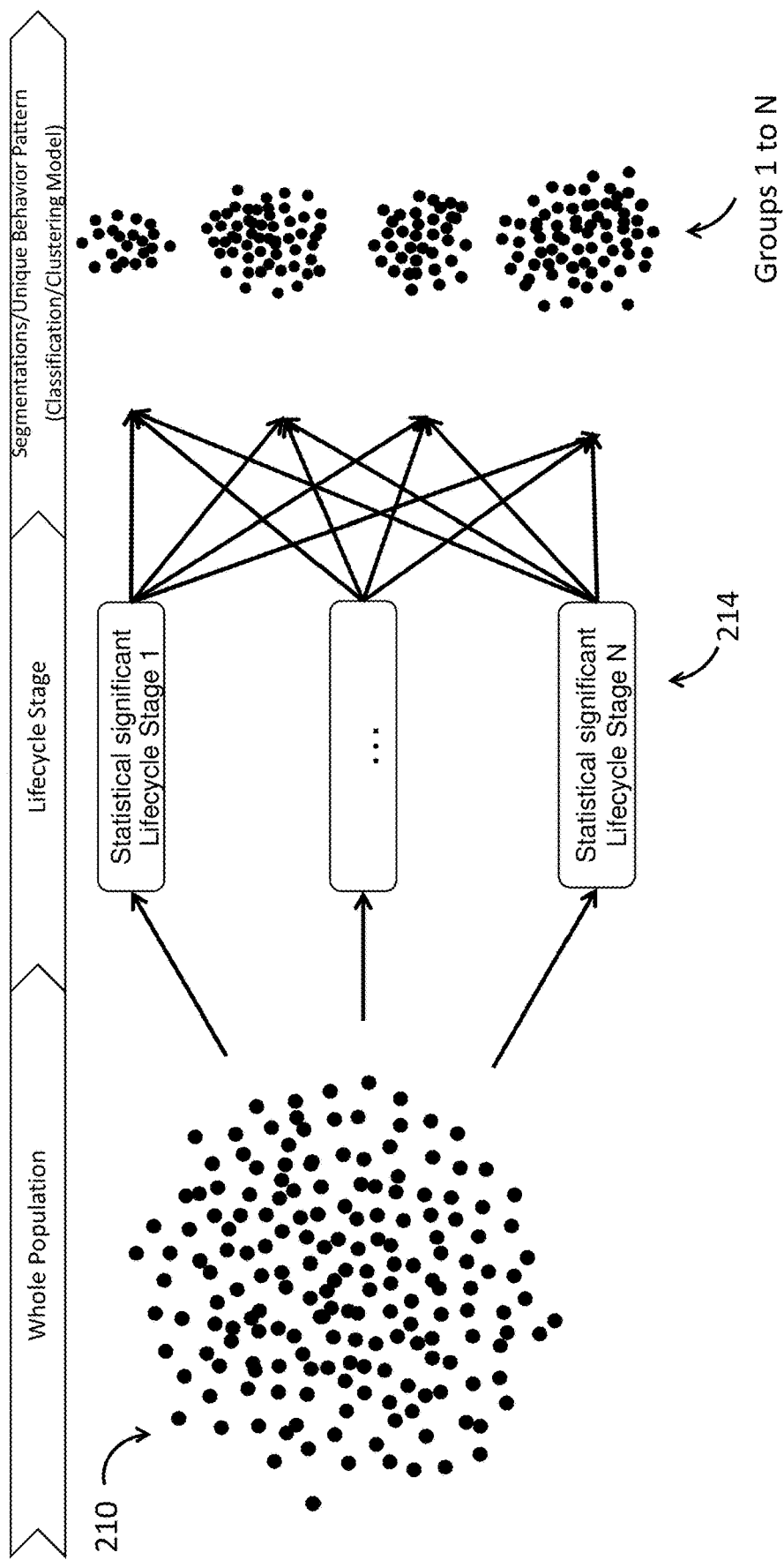
FIG. 3 depicts a generalized segmentation of the input data based on the stages of a life cycle according to one or more embodiments of the invention.
Figure 4:
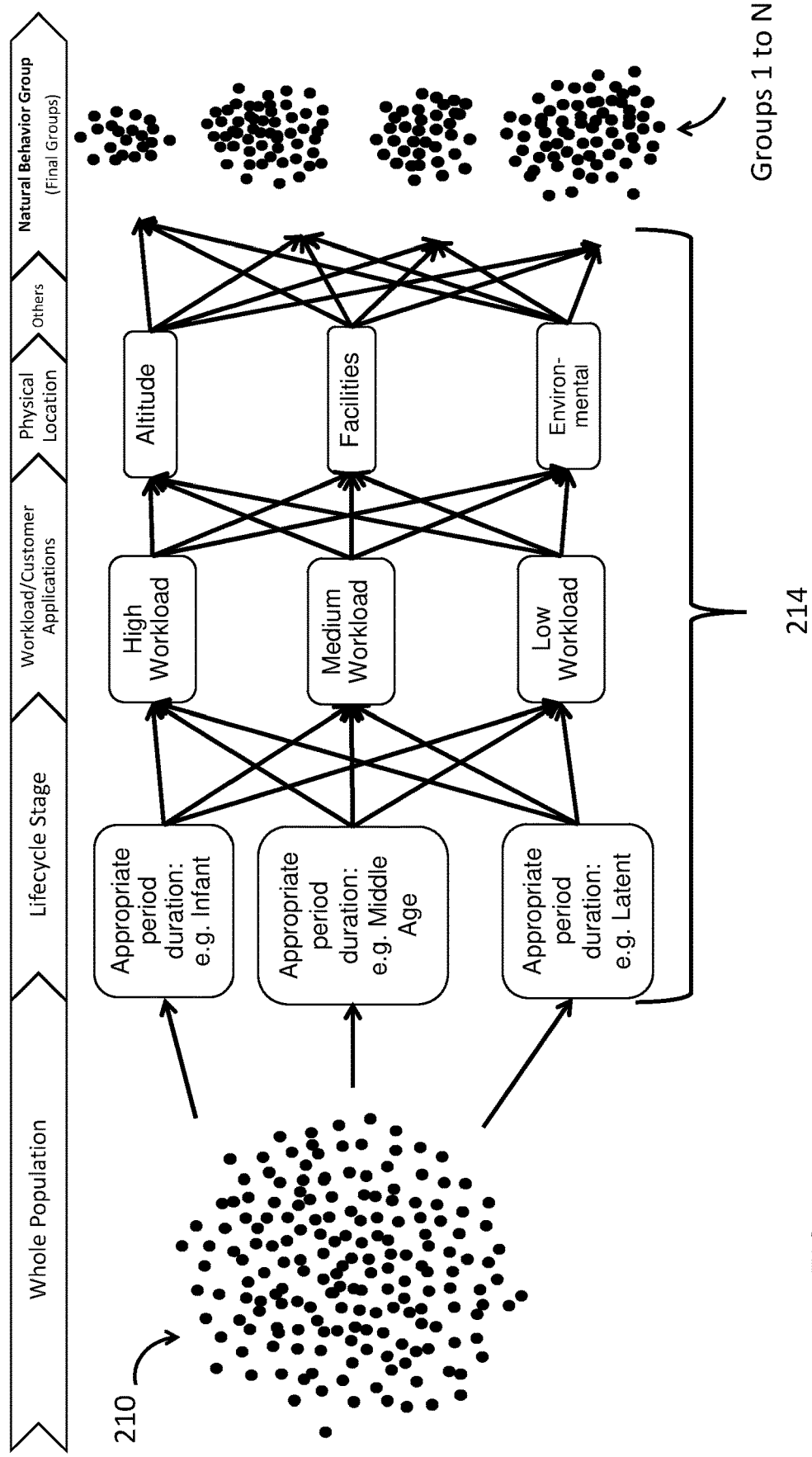
FIG. 4 depicts more specific segmentation of the input data according to the stages of a particular life cycle for a particular system, product or component according to one or more embodiments of the invention.

However, a smart flow according to embodiments of the present invention includes the new data input 210 passing through the behavior segmentation 214 such that the new data input 210 is segmented into multiple groups 1 through N. For example, the segmentation may utilize unique characteristics to classify the input data 210 into groups such as geographic, demographic, psychographic, behavioral or benefits sought. In one or more embodiments as depicted in FIG. 3, the input data may be segmented according to stages of a life cycle. Also, FIG. 4 depicts a particular embodiment which includes segmentation of the input data 210 according to stages of a particular life cycle for a particular system, product or component. In other words, the segmentation may utilize the stages within a life cycle of a system, product or component to divide the input data 210 into different groups or different failure modes. In one or more embodiments, for example, a first product and a second product are different vintages and the first product is newer than the second product. The term "vintage" refers to a grouping of individual units of a component, products, or system that is manufactures within the same time frame and have the same specifications (form/fit/function) and are expected to have similar performance characteristics.

Figure 5:
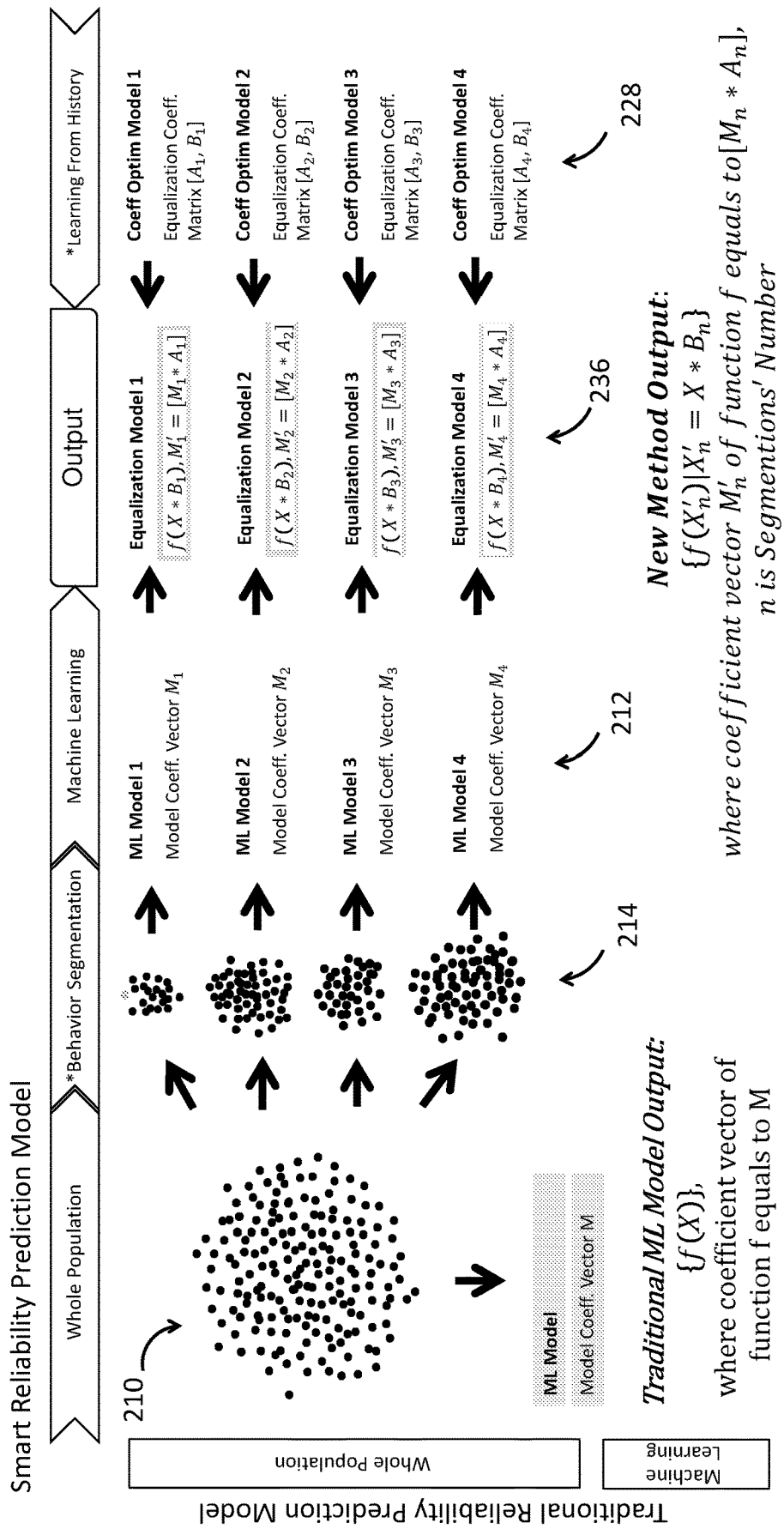
FIG. 5 is a generalized depiction of an enhanced prediction model according to the flow diagram of FIG. 2.

Still referring to FIG. 2, the segmented groups 1 through N in the routine layer 202 are passed to the prediction model 212 which implements machine learning for each segmented group. Any prediction model may be used, particularly those commonly used in a particular industry. Prediction model analysis yields model coefficient vectors which provide parameters for making a failure rate prediction. In other words, in FIG. 2 the failure modes generated by the prediction model 212 may be referred to as initial failure modes defined by corresponding parameters for each group of new input data 210. In FIG. 5 a generalized enhanced prediction model is depicted for use in the flow diagram 200 of FIG. 2 and in FIG. 6 an enhanced Weibull prediction model is depicted for use in the flow diagram 200 of FIG. 2.

Figure 6:
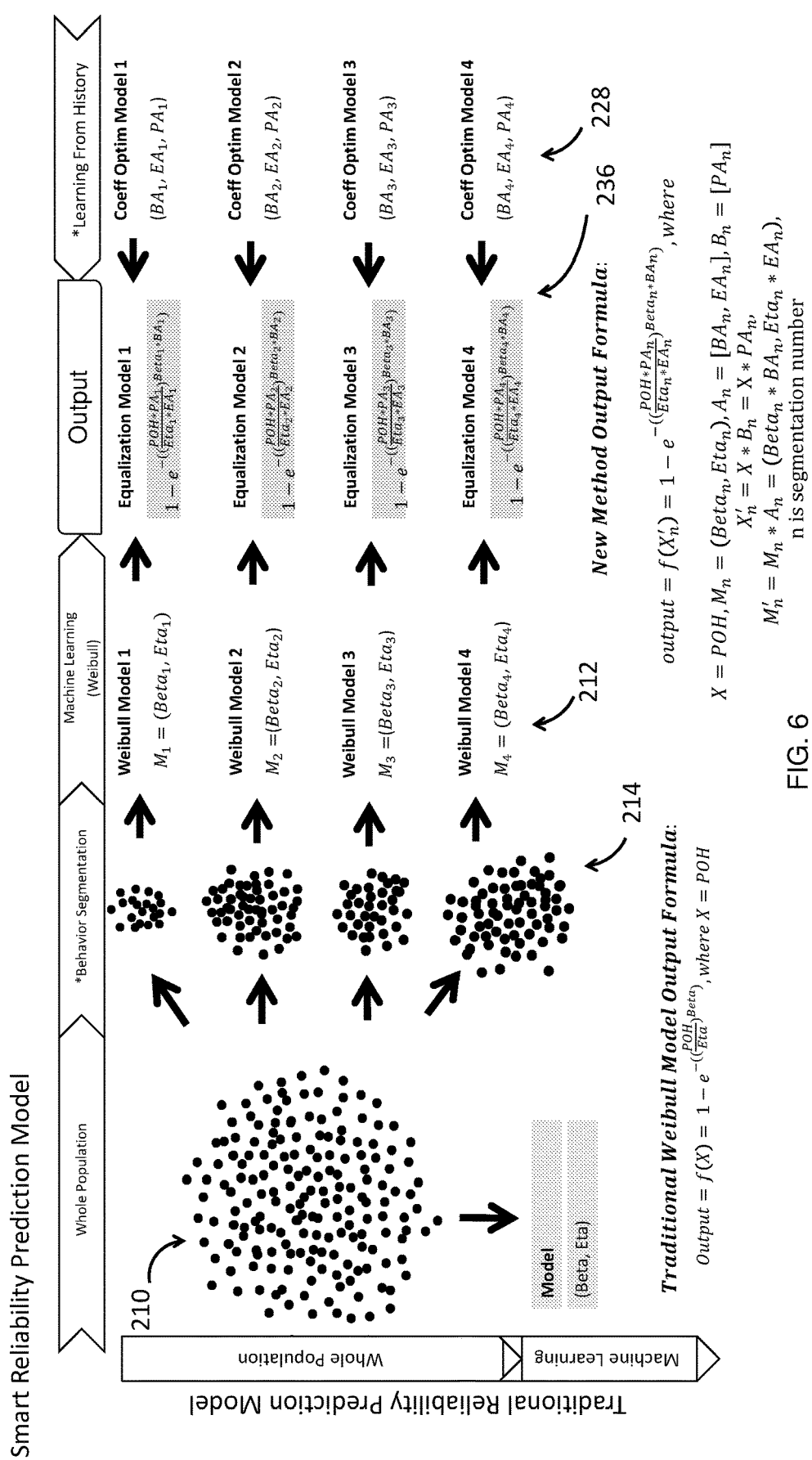
FIG. 6 depicts an enhanced Weibull prediction model for a particular system, product or component according to the flow diagram of FIG. 2.

FIGS. 5 and 6 correspond with the flow diagram of FIG. 2 in that in FIGS. 5 and 6 the new input data 210 and the behavior segmentation 214 are depicted along with the new input data being segmented into four groups. The machine learning of a general prediction model 212 produces a model coefficient vector M for each segmented group. The model coefficient vector M depends on the particular prediction model 212.

In one or more embodiments, such as when the set of input data is small, a Weibull prediction model may be used as depicted in FIG. 6. Weibull analysis utilizes two parameter or three parameter analysis. Two parameter analysis yields the parameters $\beta$, $\eta$ commonly referred to as "Beta" and "Eta," respectively. Thus, in a Weibull prediction model M equates with coefficient vector pair (Beta, Eta).

Referring again to FIG. 2, the parameters of the prediction model 212 for each segmented group from the routine layer 202 are passed to the feedback layer 206. The feedback layer 206 also utilizes information from the learning layer 204 of the flow diagram 200 of FIG. 2. The learning layer 204 begins with one or more databases storing historical prediction data 220. The historical prediction data 220 includes previously predicted parameters as well as corresponding actual parameters for failure modes previously predicted by the prediction model 212 of the routine layer 202. Parameters of the historical prediction data 220 define a history of failure rates associated with products that are stored within the one or more databases.

The historical prediction data 220 is passed through behavior segmentation 224 which segments the historical prediction data into groups 1 through N in a manner similar to behavior segmentation 214 of routine layer 202. The historical prediction data 220 may be grouped based on previous failure modes corresponding with a life cycle such as the life cycle used by the behavior segmentation 214. For example, segmenting the input data into groups may include segmenting the input data into groups based on a life cycle and each group of input data corresponds with a different failure mode of the life cycle. Segmenting historical prediction data into groups may include segmenting the historical prediction data into groups based on a plurality of failure modes that have occurred during the life cycle.

Still referring to the learning layer 204 of the flow process 200 of FIG. 2, the historical prediction data 220 of each of the segmented groups 1 through N is then passed to the coefficient optimization model 228. The coefficient optimization model 228 for each segmented group 1 through N compares previous prediction values derived from the historical prediction data 220 with corresponding actual values derived from the historical prediction data 220 to generate equalization coefficient factor pairs 1 through N as shown in layer 204. The general example of FIG. 4 depicts equalization coefficient matrixes [A, B] for predictive models in general where A and B are used to adjust the parameters provided by the predictive model 212 from routine layer 202. FIG. 6 depicts coefficient optimization factor sets (BA, EA, PA) for a three-parameter Weibull prediction model for a particular component or product such as a hard drive. PA, BA and EA are coefficients used to equalize the Weibull models across distinct segments. The BA coefficient adjusts the traditional Weibull Beta coefficient. The EA coefficient adjusts the traditional Weibull Eta coefficient. The PA coefficient adjusts the model input, which in the case of electronic/computer components, is the component's power on hours (POH). The equalization coefficient factor pairs 1 through N of learning layer 204 are then provided to the equalization coefficient model 236 of feedback layer 206.

The predicted parameters from the prediction model 212 of routine layer 202 are also provided to the equalization coefficient model 236 of feedback layer 206.

Figure 7:
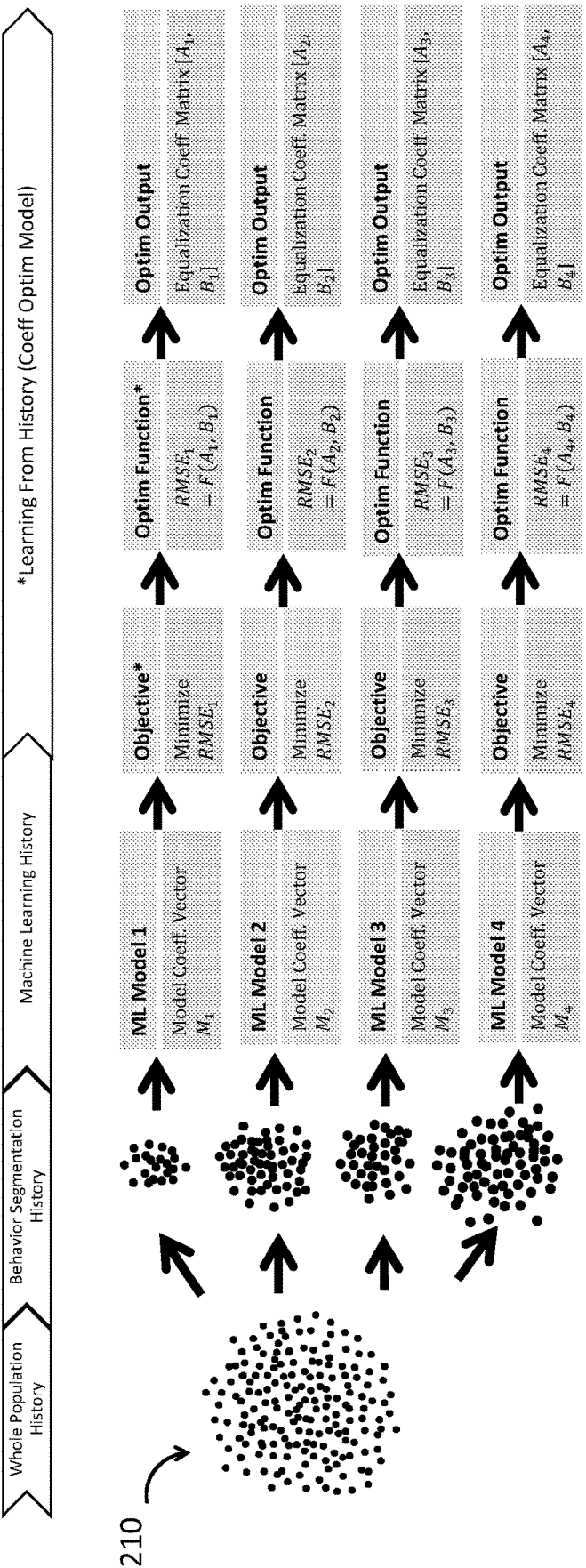
FIG. 7 depicts how to calculate the equalization coefficients of vector pairs for the learning layer of the flow diagram of FIG. 2 according to one or more embodiments of the invention.
Figure 8:
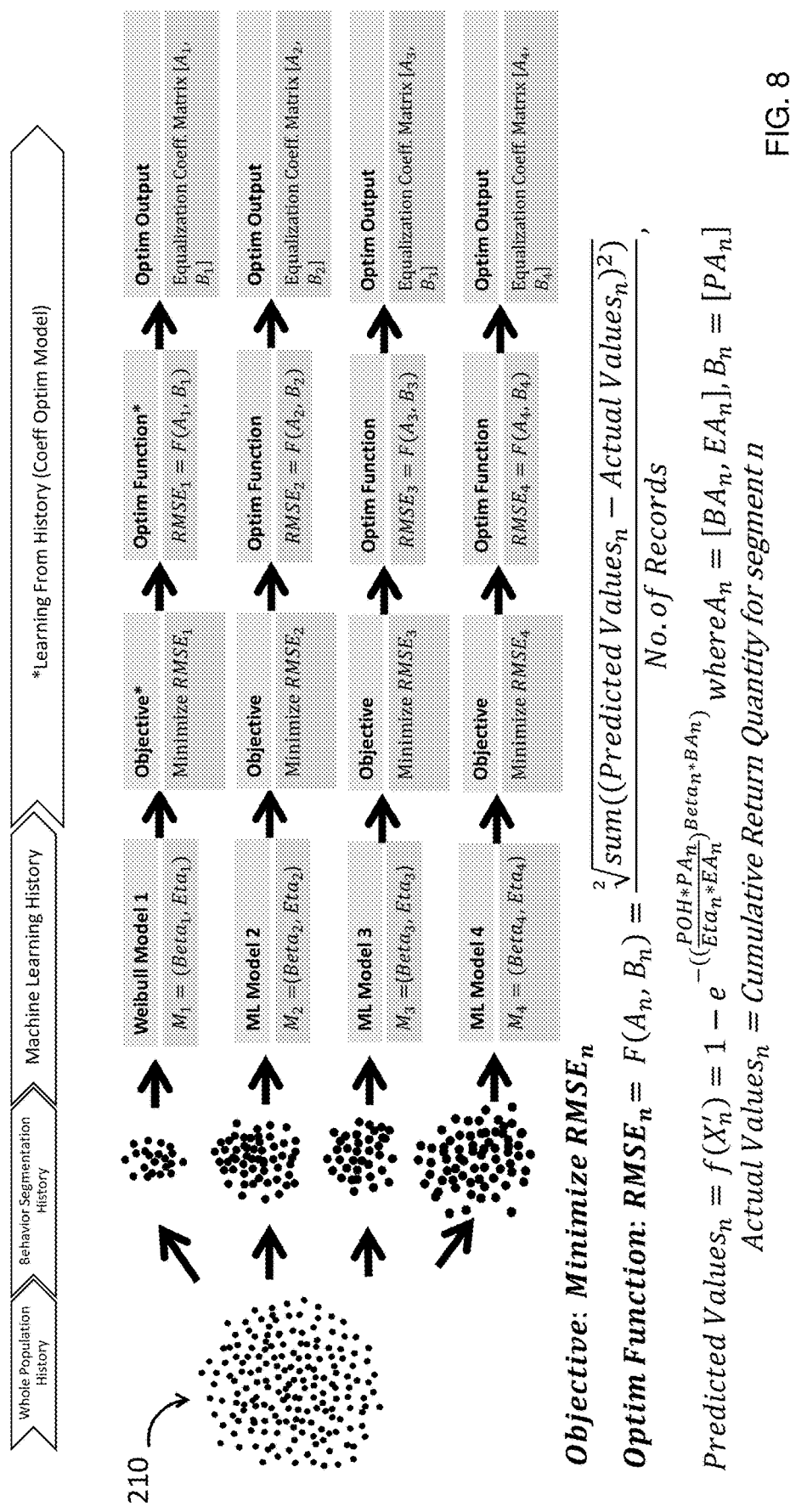
FIG. 8 depicts utilizing the Weibull prediction model and calculating the equalization coefficients of vector pairs for the learning layer of the flow diagram of FIG. 2 according to one or more embodiments of the invention.

As shown in FIGS. 5 and 6, the comparisons define a difference or gap between previous prediction parameters and actual parameters within each group of the segmented historical prediction data 210 to determine whether there were errors with any of the parameters of the previous failure modes. The historical prediction data may be monitored and errors then determined in predicted failure rates by comparing parameters of the predicted failure rates with parameters of actual failure rates. The equalization coefficients defining the difference or gap are then utilized as feedback to generate the updated parameters of the prediction model. In other words, the differences or gaps are provided to the equalization coefficient model 236 to be used in combination with the prediction parameters of the prediction model 212 of the routine layer 202 in order to minimize any possible errors in the prediction parameters of the prediction model 212. Thus, modifying parameters of a failure mode generated by a prediction model for a particular product based on segmented historical prediction data may include determining the difference between parameters of a failure mode stored within the historical prediction data 220. More particularly, FIG. 7 depicts the general process of how to calculate the equalization coefficients of the vector pairs for the feedback layer 2 of the flow diagram 200. FIG. 8 then depicts the process of how to calculate the equalization coefficients of the vector pairs for the feedback layer 2 when the flow diagram 200 utilizes a Weibull prediction model. Thus, the equalization coefficient model 236 provides enhanced output such that the parameters of the prediction model 212 are revised or updated and therefore become more accurate.

In one or more embodiments, outputting updated parameters of the prediction model 212 comprises generating a future failure rate utilizing the adjusted parameters. Also, In one or more embodiments, the output of the updated parameters from the equalization coefficient model 236 become feedback and are stored as historical prediction data 220 in learning layer 204.

Also, the updated parameters of the prediction model 212 can be used to trigger actions such as preemptive or corrective actions in manufacturing processes. For example, updated parameters can be used to initiate instructions to an automated assembly system, line or device. The assembly system, line or device could be controlled or instructed to change such as halt, speedup or slow down. In another example, the updated parameters could result in instructions to remove, by an automated assembly device, a component or batch of components from an assembly line. The updated parameters of the prediction model 212 can be used in other types of processes as well.

Figure 9:
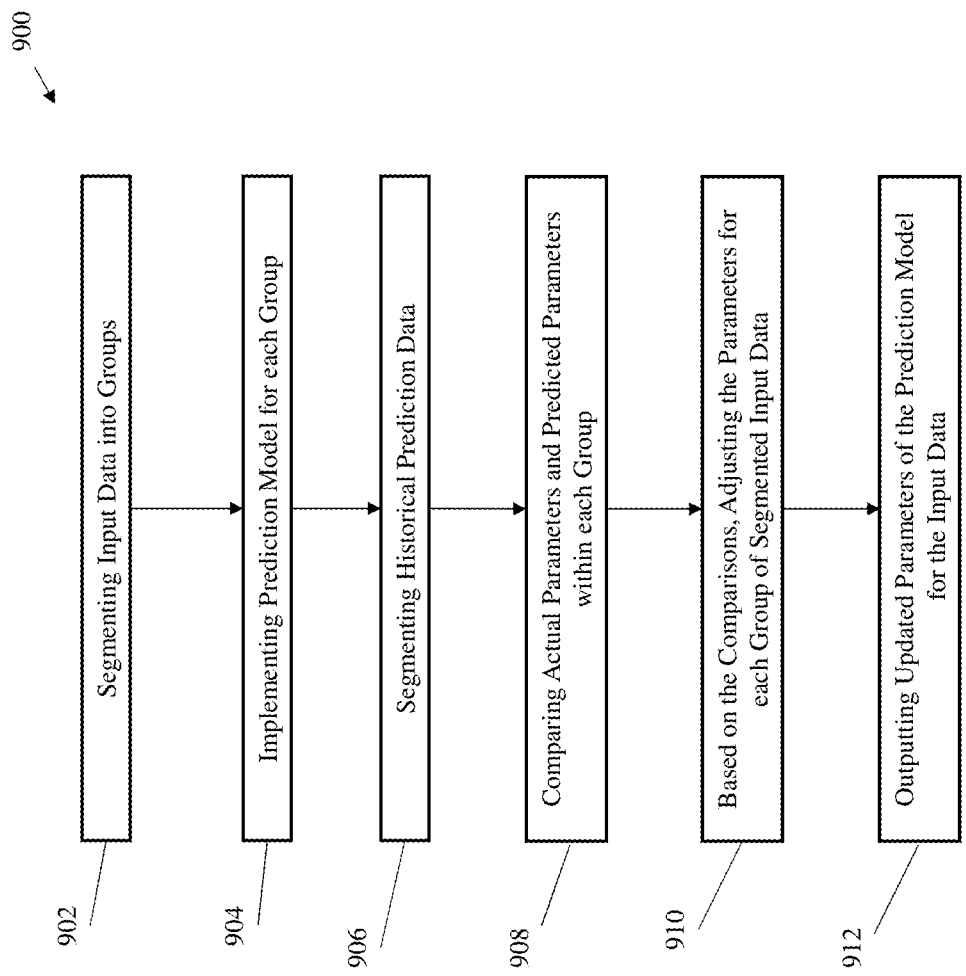
FIG. 9 depicts an exemplary process for enhancing a predictive model to provide more accurate failure predictions.

FIG. 9 depicts a flow diagram of a method for enhancing a prediction model for generating future failure predictions more accurately according to one or more embodiments of the invention. The method 900 includes process block 902 for segmenting input data into groups. Process block 904 then includes implementing a prediction model 212 for each segmented group. Method 900 also includes process block 906 for segmenting historical prediction data and process block 908 for comparing at a coefficient optimization model 228 actual parameters and predicted parameters within each segmented group. Next, the process 900 includes adjusting the parameters for each group of segmented input data based on the comparisons. The process 900 also includes outputting updated parameters of the prediction model for the input data.

The process 900 may also include the prediction model performing a Weibull analysis. The process 900 may also include segmenting the input data into groups based on a life cycle and each group of input data corresponding with a different failure mode of the life cycle. The process 900 may also include determining a difference between the actual parameters and the predicted parameters within each group of segmented historical prediction. The process 900 may also include utilizing the differences between the actual parameters and the predicted parameters within each group of segmented historical prediction as feedback to generate the updated parameters of the prediction model.

Additional processes may also be included. It should be understood that the processes depicted in FIG. 9 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for enhancing a prediction model for generating future failure predictions, comprising:
    inputting data into a prediction model to generate an initial failure mode for a first product, wherein the initial failure mode provides a future failure rate for the first product;
    segmenting historical prediction data comprising a plurality of failure modes that have occurred during a life cycle of a second product and determining at least two parameters including a first equalization coefficient factor and second equalization coefficient factor of each segmented group of the historical prediction data;
    analyzing the historical prediction data and determining prediction errors in predicted failure rates associated with the second product by comparing parameters of the predicted failure rates with parameters of actual failure rates to determine at least one difference between the parameters of the predicted failure rates and the parameters of actual failure rates, the at least one difference indicative of the prediction errors;
    modifying the at least two parameters of the initial failure mode generated by the prediction model for the first product based on the segmented historical prediction data; and
    generating with the prediction model a new failure mode defining a new future failure rate for the first product utilizing the modified at least two parameters.

2. The computer-implemented method of claim 1 further comprising generating initial failure modes for each segmented group of the historical prediction data, wherein each initial failure mode is defined by at least two parameters.

3. The computer-implemented method of claim 1 wherein modifying the at least two parameters includes modifying a plurality of equalization coefficient factors of at least one of the segmented groups of the historical prediction data..

4. The computer-implemented method of claim 1 wherein the prediction model performs one of:
    a two parameter Weibull analysis based on the plurality of equalization coefficient factors, the plurality of equalization coefficient factors including a first vector parameter and a second vector parameter; or
    a three parameter Weibull analysis based on the plurality of equalization coefficient factors.

5. The computer-implemented method of claim 1 wherein parameters of the historical prediction data define a history of failure rates associated with the second product stored in a database.

6. The computer-implemented method of claim 1 wherein the first product and the second product are different vintages and the first product is newer than the second product.

7. A system for enhancing a prediction model for generating future failure predictions, comprising:
    a processor communicatively coupled to a memory; and
    a set of computer instructions stored in the memory which, when executed by the processor, performs a method comprising:
    inputting data into a prediction model to generate an initial failure mode for a first product, wherein the failure mode provides a future failure rate for the first product;
    segmenting historical prediction data comprising a plurality of failure modes that have occurred during a life cycle of a second product and determining a plurality of equalization coefficient factors for each segmented group of the historical prediction data, the plurality of equalization coefficient factors including a first vector parameter and a second vector parameter;
    analyzing the historical prediction data and determining prediction errors in predicted failure rates associated with the second product by comparing parameters of the predicted failure rates with parameters of actual failure rates to determine at least one difference between the parameters of the predicted failure rates and the parameters of actual failure rates, the at least one difference indicative of the prediction errors;
    modifying the at least two parameters of the initial failure mode generated by the prediction model for the first product based on the segmented historical prediction data; and
    generating with the prediction model a new failure mode defining a new future failure rate for the first product utilizing the modified at least two parameters,
    wherein parameters of the historical prediction data define a history of failure rates associated with the second product stored in a database.

8. The system of claim 7 wherein modifying the at least two parameters includes modifying the plurality of equalization coefficient factors of at least one of the segmented groups of the historical prediction data.

* * * * *